(12) United States Patent
Imura et al.

(10) Patent No.: US 11,799,092 B2
(45) Date of Patent: Oct. 24, 2023

(54) CATHODE CATALYST LAYER OF FUEL CELLS, AND FUEL CELL

(71) Applicant: PANASONIC INTELLECTUAL PROPERTY MANAGEMENT CO., LTD., Osaka (JP)

(72) Inventors: Shinichiro Imura, Hyogo (JP); Takeshi Minamiura, Osaka (JP); Hitoshi Ishimoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 162 days.

(21) Appl. No.: 17/044,654

(22) PCT Filed: Jul. 18, 2019

(86) PCT No.: PCT/JP2019/028329
§ 371 (c)(1),
(2) Date: Oct. 1, 2020

(87) PCT Pub. No.: WO2020/022191
PCT Pub. Date: Jan. 30, 2020

(65) Prior Publication Data
US 2021/0098797 A1 Apr. 1, 2021

(30) Foreign Application Priority Data
Jul. 25, 2018 (JP) .................. 2018-139803

(51) Int. Cl.
*H01M 4/92* (2006.01)
*H01M 4/86* (2006.01)
(Continued)

(52) U.S. Cl.
CPC ......... *H01M 4/921* (2013.01); *H01M 4/8673* (2013.01); *H01M 8/10* (2013.01);
(Continued)

(58) Field of Classification Search
CPC ...... H01M 4/921; H01M 4/8673; H01M 8/10; H01M 8/1018; H01M 2004/8689;
(Continued)

(56) References Cited

U.S. PATENT DOCUMENTS

2003/0096149 A1* 5/2003 Koyama ................ C08J 5/2256
521/27
2004/0115502 A1 6/2004 Fukuda et al.
(Continued)

FOREIGN PATENT DOCUMENTS

JP 2004-193106 A 7/2004
JP 2004-247316 A 9/2004
(Continued)

OTHER PUBLICATIONS

International Search Report and Written Opinion issued in International Patent Application No. PCT/JP2019/028329, dated Oct. 8, 2019; with partial English translation.

*Primary Examiner* — Helen Oi K Conley
(74) *Attorney, Agent, or Firm* — McDermott Will & Emery LLP

(57) ABSTRACT

A cathode catalyst layer of fuel cells, the cathode catalyst layer including a first fibrous electrically-conductive member, a first particulate electrically-conductive member, first catalyst particles, and a first proton conductive resin. A ratio $I_1/C_1$ of a mass of the first proton conductive resin to a mass of the first electrically particulate conductive member is in a range of 1.0 to 1.6. A ratio of the first fibrous electrically-conductive member to 100 parts by mass of the first particulate conductive member is 30 to 50 parts by mass. The first proton conductive resin has an EW value of 600 to 850.

5 Claims, 2 Drawing Sheets

(51) Int. Cl.
    *H01M 8/10*       (2016.01)
    *H01M 8/1018*   (2016.01)

(52) U.S. Cl.
    CPC .. *H01M 8/1018* (2013.01); *H01M 2004/8689* (2013.01); *H01M 2008/1095* (2013.01); *H01M 2250/20* (2013.01)

(58) Field of Classification Search
    CPC ..... H01M 2008/1095; H01M 2250/20; H01M 4/8663; H01M 4/8605; Y02E 60/50
    See application file for complete search history.

(56)         References Cited

U.S. PATENT DOCUMENTS

| | | |
|---|---|---|
| 2005/0227138 A1 | 10/2005 | Fukuda et al. |
| 2006/0019140 A1 | 1/2006 | Kawazoe et al. |
| 2010/0159301 A1 | 6/2010 | Tanuma |

FOREIGN PATENT DOCUMENTS

| | | |
|---|---|---|
| JP | 2004-273257 A | 9/2004 |
| JP | 2005-302339 A | 10/2005 |
| JP | 2006-040633 A | 2/2006 |
| JP | 2006-216385 A | 8/2006 |
| JP | 2008-258057 A | 10/2008 |
| JP | 2009-117248 A | 5/2009 |
| JP | 2010-146965 A | 7/2010 |
| JP | 2012-243431 A | 12/2012 |
| JP | 2015-176863 A | 10/2015 |
| WO | 2005/124912 A1 | 12/2005 |

* cited by examiner

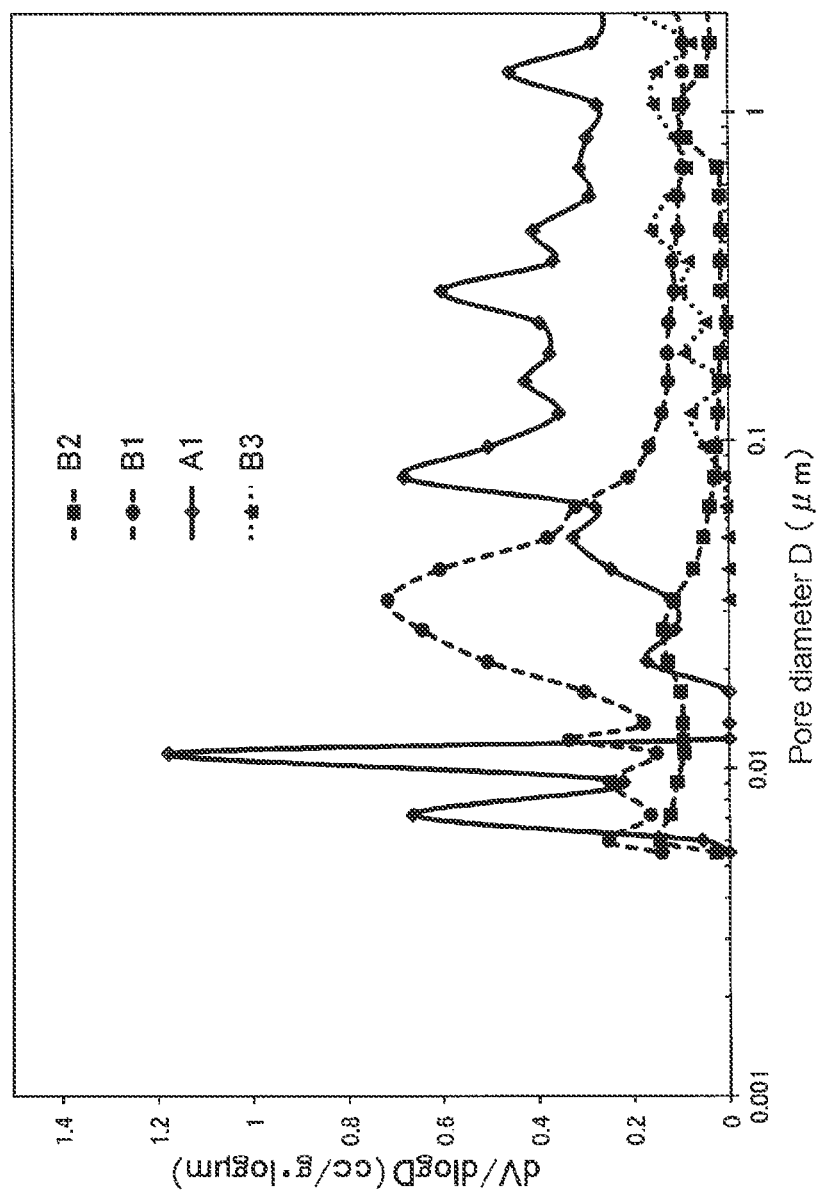

under 35 U.S.C. § 371 of International Patent Application No. PCT/JP2019/028329, filed on Jul. 18, 2019, which in turn claims the benefit of Japanese Application No. 2018-139803, filed on Jul. 25, 2018, the entire disclosures of which Applications are incorporated by reference herein.

TECHNICAL FIELD

The present disclosure relates to a cathode catalyst layer of fuel cells, and a fuel cell.

BACKGROUND ART

A fuel cell includes a membrane electrode assembly having an electrolyte membrane and a pair of electrodes sandwiching the electrolyte membrane. The pair of the electrodes each include a catalyst layer and a gas diffusion layer arranged in this order from the electrolyte membrane side.

With regard to the configuration of the catalyst layer, Patent Literature 1 discloses a catalyst layer containing secondary particles and an ionomer penetrating into the secondary particles and covering the outside of the secondary particles. The secondary particles are formed of a plurality of primary particles which are carbon particles with platinum catalyst supported thereon. The secondary particles have a radius of 105 nm to 200 nm. A ratio (I/C) of a mass of the ionomer to a mass C of the carbon in the catalyst layer is 0.65 to 1.35.

Patent Literature 2 discloses a catalyst layer containing a catalytic substance and a polymer electrolyte, and further containing a fibrous substance having hydrophilicity or having been treated to have a hydrophilic surface.

In the above Patent Literatures 1 and 2, the ionomer and the polymer electrolyte have proton conductivity. Proton conduction, however, requires water. Typically, a fuel gas or an oxidizing gas is humidified, and then, the humidified gas is fed to the catalyst layer.

Patent Literature 3 relating to a methanol fuel cell in which methanol is fed to the anode discloses an anode catalyst layer containing an anode catalyst that includes a fibrous supported-catalyst whose carrier is carbon fibers and a particulate supported-catalyst whose carrier is carbon particles. The anode catalyst layer is configured such that the ratio of the fibrous supported-catalyst in the anode catalyst at the surface facing the anode gas diffusion layer is higher than that at the surface facing the electrolyte membrane. In the anode catalyst layer configured as above, the weight ratio of the electrolyte to the anode catalyst is set to 50 to 140 wt % at the surface facing the anode gas diffusion layer, and 150 to 250 wt % at the surface facing the electrolyte membrane.

Patent Literature 4 relating to a solid polymer fuel cell discloses an electrode catalyst layer containing composite particles composed of electrically conductive particles and catalyst particles supported thereon, a proton conductive polymer, and polytetrafluoroethylene. The ratio of each component in the electrode catalyst layer is 20.000 mass % or more and 80.000 mass % or less for the composite particles, 19.999 mass % or more and 60.000 mass % or less for the proton conductive polymer, and 0.001 mass % or more and 20.000 mass % or less for the polytetrafluomethylene. The equivalent weight (EW) of the proton conductive polymer is preferably 250 or more and 2000 or less, more preferably 250 or more and 800 or less.

CITATION LIST

[Patent Literature]

[PTL 1] Japanese Laid-Open Patent Publication No, 2012-243431
[PTL 2] Japanese Laid-Open Patent Publication No. 2004-247316
[PTL 3] Japanese Laid-Open Patent Publication No. 2009-117248
[PTL 4] Japanese Laid-Open Patent Publication No. 2004-273257

SUMMARY OF INVENTION

Technical Problem

As described above, in fuel cells, in order to reduce the resistance of proton transport, a fuel gas or an oxidizing gas is humidified before feeding. It is therefore necessary to provide a unit (i.e., humidifier) for generating water vapor to humidify the fuel gas or the oxidizing gas, separately from a fuel cell stack.

However, when the fuel cell is used for mobile applications, such as vehicle-mounted use, there is a case where not enough space is left for installing the humidifier. Under such circumstances, much expectation is placed on a fuel cell that exhibits excellent output performance when operated with low humidified feed gases relative humidity: 20% to 40%).

In the conventional fuel cell, when operated in a low humidified state, the ionomers in the electrolyte membrane and the catalyst layer dry up, and the resistance of proton transport increases. As a result, the output power declines. By raising the I/C in the catalyst layer and thereby enhancing the water retention, the dry-up can be suppressed, but the gas diffusivity decreases. As a result, the output power declines.

Solution to Problem

One aspect of the present disclosure relates to a cathode catalyst layer of fuel cells, the cathode catalyst layer including a first fibrous electrically-conductive member, a first particulate electrically-conductive member, first catalyst particles, and a first proton conductive resin, wherein a ratio $I_1/C_1$ of a mass of the first proton conductive resin to a mass of the first particulate electrically-conductive member is in a range of 1.0 to 1.6, a ratio of the first fibrous electrically-conductive member to 100 parts by mass of the first particulate electrically-conductive member is 30 to 50 pails by mass, and the first proton conductive resin has an EW value of 600 to 850.

Another aspect of the present disclosure relates to a fuel cell including a cathode having the cathode catalyst layer of the above aspect, an anode, and an electrolyte membrane interposed between the anode and the cathode.

Advantageous Effects of Invention

According to the present disclosure, under low-humidity operating conditions, the gas diffusivity and the proton conductivity of the catalyst layer can be both ensured, and the power generation performance of fuel cells can be improved.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 2 A graph of logarithmic differential pore volume distributions as measured by a mercury intrusion porosimetry, with respect to cathode catalyst layers used in a cell A1 of Example 1 and cells B1 to B3 of Comparative Examples 1 to 3.

DESCRIPTION OF EMBODIMENTS

Figure 1:
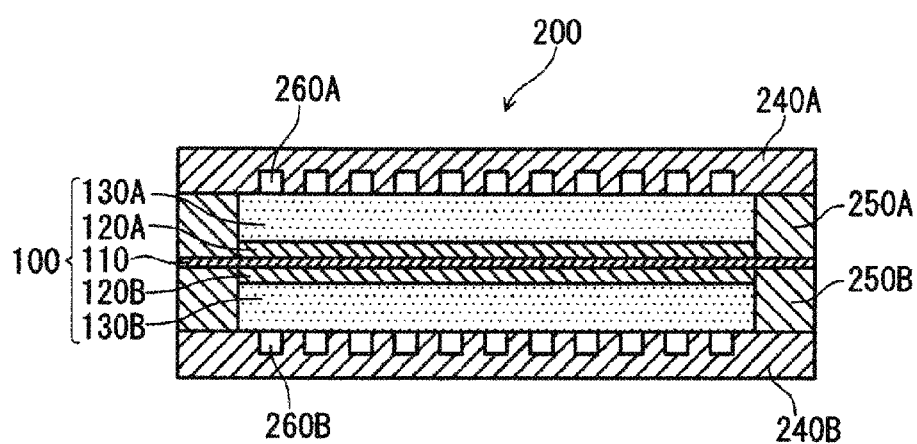
FIG. 1 A schematic cross-sectional view showing a structure of a unit cell of a fuel cell stack according to an embodiment of the present disclosure.

A cathode catalyst layer of fuel cells according to an embodiment of the present disclosure includes a fibrous electrically-conductive member (first fibrous conductive member), a particulate electrically-conductive member (first particulate conductive member), catalyst particles (first catalyst particles), and a proton conductive resin (first proton conductive resin). The cathode catalyst layer satisfies the following conditions (1) to (3).

(1) A ratio $I_1/C_1$ of a mass of the first proton conductive resin to a mass of the first particulate conductive member is in a range of 1.0 to 1.6.

(2) A ratio of the first fibrous conductive member to 100 parts by mass of the first particulate conductive member is 30 to 50 parts by mass.

(3) An EW value of the first proton conductive resin is 600 to 850.

The EW value herein means a mass (in grams) of the proton conductive resin in a dry state per one mole of a proton exchange group (e.g., sulfonic acid group). The smaller the EW value is, the larger the number of the proton exchange groups in the proton conductive resin is, which reduces the proton transport resistance.

By increasing the ratio $I_1/C_1$ of the mass of the first proton conductive resin to the mass of the first particulate conductive member, due to water retention effects, a low proton transport resistance can be achieved even under low humidified conditions. On the other hand, the gas diffusivity decreases. However, by increasing the ratio of the first fibrous conductive member to the first particulate conductive member, sufficient diffusion paths for the gas can be ensured, even when the $I_1/C_1$ is high.

Setting the $I_1/C_1$ in a range of 1.0 to 1.6 and the ratio of the first fibrous conductive member to 100 parts by mass of the first particulate conductive member to 30 to 50 parts by mass are necessary for achieving both a low proton transport resistance and a high gas diffusivity, under low humidified conditions.

Increasing the ratio of the fibrous conductive member tends to increase the thickness of the catalyst layer. When the thickness of the catalyst layer is increased, the proton transport resistance tends to increase. However, by using the first proton conductive resin having an EW value of 850 or less, the proton transport resistance can be suppressed low even when the thickness of the catalyst layer is increased by introducing the fibrous conductive member.

On the other hand, in view of the ease of production of the proton conductive resin, the EW value of the first proton conductive resin is preferably 600 or more.

Furthermore, it has been found that when the first proton conductive resin has an EW value of 600 to 850, the proton transport resistance is reduced, and the gas diffusivity can be further improved. The EW value of the first proton conductive resin may be 600 to 850, may be 600 to 800, and may be 650 to 800.

As a result of measuring a pore diameter D distribution of the catalyst layer by a mercury intrusion porosimetry, it has been found that a catalyst layer satisfying the above conditions (1) to (3) has a logarithmic differential pore volume dV/d (log D) distribution that can have a peak in a range between 0.006 μm and 0.015 μm. This indicates that gas diffusion paths are formed via micropores having a pore diameter of 0.006 μm to 0.015 μm, and this leads to improved gas diffusivity.

Note that the log D is a common logarithm of the pore diameter D (μm). A peak in the range of 0.006 μm to 0.015 μm can have a maximum peak value of 0.4 (cc/g·log μm) or more.

In the pore volume distribution, the volume of pores having a pore diameter D of 0.006 Mm to 0.015 μm can be 20% or more, relative to the volume of pores having a pore diameter D of 0.006 μm to 0.2 μm.

Although still unclear, the micropores are presumably formed through the following mechanism.

The proton conductive resin having an EW value of 600 to 850 has a large number of side chains with proton exchange groups, and is bulky in structure. By mixing such proton conductive resin with the fibrous conductive member, a three-dimensional network is formed in which the proton conductive resin and the fibrous conductive member are entangled with each other. This network is considered to form a pore structure having micropores that allow for gas diffusion.

The catalyst layer as above is excellent in gas diffusivity and therefore is suitably applicable as a cathode catalyst layer disposed on the cathode side of a fuel cell.

A fuel cell according to an embodiment of the present disclosure includes a cathode having the aforementioned cathode catalyst layer, an anode, and an electrolyte membrane interposed between the cathode and the anode. The anode typically has an anode catalyst layer.

The anode catalyst layer disposed on the anode side, like the cathode catalyst layer, may include a fibrous electrically-conductive member (second fibrous conductive member), a particulate electrically-conductive member (second particulate conductive member), catalyst particles (second catalyst particles), and a proton conductive resin (second proton conductive resin). It is noted, however, the material and/or the blending ratio of the fibrous conductive member, the particulate conductive member, the catalyst particles, and the proton conductive resin in the anode catalyst layer may not necessarily be the same as those in the cathode catalyst layer, and if necessary, may be changed as appropriate.

Particularly when operated under low-humidified conditions, in the anode catalyst layer, a ratio $I_2/C_2$ of a mass of the second proton conductive resin to a mass of the second particulate conductive member is preferably set greater than the ratio $I_1/C_1$ of the mass of the first proton conductive resin to the mass of the first particulate conductive member in the cathode catalyst layer.

At the cathode, water is produced through a reaction with an oxidizing gas. In contrast, at the anode where no water is produced, it is more likely to be dry than at the cathode, tending to fall in an environment with low moisture. However, by setting the $I_2/C_2$ in the anode catalyst layer greater than the $I_1/C_1$ in the cathode catalyst layer, the water produced at the cathode is more likely to diffuse toward the anode side. Thus, further improvement in output power can be expected under low-humidity operating conditions.

A ratio of the second fibrous conductive member to 100 parts by mass of the second particulate conductive member may be set to 30 to 60 parts by mass, and the $I_2/C_2$ may be set to 1.2 to 2.5 (more preferably, 1.4 to 2.5). By setting as above, the humidity on the anode side can tend to be increased, and high output power can tend to be achieved even under low-humidity operating conditions.

A description will be given below of component elements common to the catalyst layers (the anode catalyst layer and the cathode catalyst layer).

(Fibrous Conductive Member)

Examples of the fibrous conductive member include fibrous carbon materials, such as vapor-grown carbon fibers (VGCF (registered trademark)), carbon nanotubes, and carbon nanofibers. The fibrous conductive member has a diameter $D_F$ which may be any diameter, but is preferably 200 nm or less, more preferably 5 nm or more and 200 nm or less, still more preferably 10 nm or more and 170 nm or less. In this case, while the volume ratio of the fibrous conductive member in the catalyst layer is reduced, sufficient diffusion paths for the gas can be ensured, and the gas diffusivity can be improved. The diameter $D_F$ of the fibrous conductive member can be obtained by taking out 10 fibrous conductive members randomly from the catalyst layer, and averaging the diameters of them. The diameter is a length in a direction perpendicular to the longitudinal direction of the fibrous conductive member.

The fibrous conductive member has a length $L_F$ which also may be any length, but is preferably 0.2 μm or more and 20 μm or less, more preferably 0.2 μm or more and 10 μm or less. In this case, the fibers are substantially linear in shape, and at least some of the fibrous conductive members are oriented along the thickness direction of the catalyst layer, and sufficient gas diffusion paths tend to be ensured. The length $L_F$ of the fibrous conductive member is an average fiber length, which can be obtained by taking out 10 fibrous conductive members randomly from the catalyst layer, and averaging the fiber lengths of them. Note that, in the case of a substantially linear fiber, the fiber length of the fibrous conductive member means a length of a straight line connecting one end of the fibrous conductive member to the other end thereof.

The fibrous conductive member may have an empty space (hollow portion) in its inside. In this case, in the catalyst layer, the fibrous conductive member may be open at both ends in the longitudinal direction. Here, that the fibrous conductive member is open at both ends in the longitudinal direction means that the hollow portion is in communication with the outside air via the open ends. In other words, the openings at both ends of the fibrous conductive member are not closed by the electrolyte membrane and the gas diffusion layer, and gas can enter and exit through the both ends.

The fibrous conductive member having the hollow portion may have a through-hole in its sidewall, the through-hole for allowing communication between the hollow portion and the outside air. The catalyst particles can be disposed on the sidewall of the fibrous conductive member so as to close at least part of the through-hole, and immobilized. The catalyst particles disposed on the sidewall so as to close at least part of the through-hole can efficiently contact with the reaction gas, and thus, the reaction efficiency of the catalyst layer can be significantly improved.

(Particulate Conductive Member)

The particulate conductive member is not limited, but is preferably carbon black in terms of its excellent electrical conductivity. Examples of the carbon black include acetylene black, Ketjen black, thermal black, furnace black, and channel black. The particle diameter thereof (or the length of a structure composed of connected primary particles) is not limited, and any electrically conductive material as conventionally used for the catalyst layer of fuel cells may be used.

(Catalyst Particle)

The catalyst particles are not limited, but may be a catalyst metal, such as an alloy or simple substance selected from Sc, Y, Ti, Zr, V, Nb, Fe, Co, Ni, Ru, Rh, Pd, Pt, Os, Ir, lanthanoid series elements, and actinoid series elements. Examples of the catalyst particles used for the anode include Pt and a Pt—Ru alloy. Examples of the catalyst particles used for the cathode include Pt and a Pt—Co alloy. At least some of the catalyst particles are supported on the particulate conductive member. The catalyst particles may be supported both on the particulate conductive member and the fibrous conductive member. In this case, the catalyst particles are more likely to come in contact with the gas, and the oxidation or reduction of the gas can be allowed to proceed more efficiently.

On the other hand, as an optional configuration, substantially no catalyst particle may be supported on the fibrous conductive member. In other words, in the anode and/or the catalyst layer, the catalyst particles may be supported substantially only on the particulate conductive member. As the density of the catalyst particles supported on the fibrous conductive member decreases, the water repellency of the catalyst layer increases. Therefore, in this case, water removal from the catalyst layer is improved, resulting in enhanced gas diffusivity. Here, that substantially no catalyst particle is supported on the fibrous conductive member refers to the following case.

From an electron microscopic photograph of the fibrous conductive member, by counting the number i of the catalyst particles supported on the fibrous conductive member, the number of the catalyst particles supported on the fibrous conductive member per unit area of the fibrous conductive member is derived. The area of the fibrous conductive member in a region of the photograph is denoted by S. The number i of the catalyst particles within the region is divided by S, and i/S values obtained with respect to a plurality of regions within the photograph (e.g. 50 regions or more) are averaged, to gives an average i/S, from which the number of the catalyst particles supported on the fibrous conductive member per unit area of the fibrous conductive member can be estimated. When the average i/S is 5 or less per 0.01 μm$^2$ (i.e., 5 particles or less within a 100-nm-square region), the catalyst particles can be regarded as not substantially supported on the fibrous conductive member.

In view of immobilizing the catalyst particles, the catalyst particles preferably have a diameter X of 1 nm or more and 10 nm or less, more preferably 2 nm or more and 5 nm or less. When X is 1 nm or more, the catalyst particles can sufficiently exert their catalytic effect. When X is 10 nm or less, the catalyst particles can be readily supported on the particulate conductive member and on the sidewall of the fibrous conductive member.

The diameter X of the catalyst particles can be obtained as follows.

The particle diameter of a catalyst particle is determined as a diameter of an equivalent circle of the catalyst particle from an observed TEM image of the catalyst layer given that the particle is spherical in shape. In this way, the particle diameters of 100 to 300 catalyst particles were determined from the TEM image. An average of the particle diameters was calculated as the diameter X of the catalyst particles.
(Proton Conductive Resin)

The proton conductive resin is not limited. Examples thereof include a perfluorocarbon sulfonic acid-based polymer and a hydrocarbon-based polymer. Preferred is a perfluorocarbon sulfonic acid-based polymer in terms of its excellent heat resistance and chemical stability.

The proton conductive resin at least partially covers the fibrous conductive member and the catalyst particle. The proton conductive resin may further at least partially cover the particulate conductive member.

In view of maintaining the proton resistance low even under low-humidity operating conditions and enhancing the gas diffusivity, the proton conductive resin (first proton conductive resin) having an EW value of 600 to 850 is used for the cathode catalyst layer. Typically, in forming a catalyst layer, the proton conductive resin having an EW value in the above range tends to aggregate when preparing a catalyst dispersion containing catalyst particles, a particulate conductive member, and a proton conductive resin. However, by mixing the fibrous conductive member and the proton conductive resin in the catalyst dispersion in a blending ratio as described above, the aggregation of the proton conductive resin in the dispersion can be suppressed. Moreover, in the catalyst layer after application and dry, the proton conductive resin and the fibrous conductive member are entangled with each other, forming micropores suited for gas diffusion.

The catalyst layer has a thickness T which is desirably as small as possible, in view of reducing the size of the fuel cell and maintaining the proton resistance low even under low humidified conditions, thereby to achieve a high output power. On the other hand, in view of the strength, the thickness is preferably not too small. Usually, increasing the blending ratio of the fibrous conductive member tends to increase the thickness of the catalyst layer.

The cathode catalyst layer has a thickness $T_C$ which may be, for example, 4 μm or more and 20 μm or less, and may be 4 μm or more and 10 μm or less. The anode catalyst layer has a thickness $T_A$ which may be, for example, 2 μm or more and 10 μm or less. The thicknesses $T_C$ and $T_A$ of the catalyst layer are each an average thickness, which can be obtained by drawing a straight line from one principal surface to the other principal surface along the thickness direction of the catalyst layer at any 10 points in a cross section of the catalyst layer, and averaging the lengths of the straight lines.

In the cathode catalyst layer, a support density $D_1$ of the catalyst particles (first catalyst particles) supported on the particulate conductive member may be 20% to 50%. Likewise, in the anode catalyst layer, a support density $D_2$ of the catalyst particles (second catalyst particles) supported on the particulate conductive member may 20% to 50%. Here, the support density $D_1$ is a ratio of a mass of the first catalyst particles supported on the first particulate conductive member to a total mass of the first particulate conductive member and the first catalyst particles supported thereon. The support density $D_2$ is a ratio of a mass of the second catalyst particles supported on the second particulate conductive member to a total mass of the second particulate conductive member and the second catalyst particles supported thereon.

In the cathode catalyst layer, with regard to the ratio $I_1/C_1$ of the mass of the proton conductive resin to the mass of the particulate conductive member, in view of retaining water even under low-humidity operating conditions and maintaining the proton resistance low, the $I_1/C_1$ is preferably set to 1.0 or more. On the other hand, as the $I_1/C_1$ is increased, although depending on the blending ratio of the fibrous conductive member, pores are less likely to be formed, and the gas diffusivity tends to decrease. In view of obtaining sufficient gas diffusivity, the $I_1/C_1$ is preferably 1.6 or less.

At the cathode, water is produced through the reaction. In contrast, at the anode where no water is produced through the reaction, it is more likely to be dry than at the cathode, tending to fall in an environment with low moisture. Therefore, the anode catalyst layer is required to be more excellent in water retention than the cathode catalyst layer, and tends to need a high I/C.

In the anode catalyst layer, with regard to the ratio $I_2/C_2$ of the mass of the proton conductive resin to the mass of the particulate conductive member, in view of retaining water even under low-humidity operating conditions and maintaining the proton transport resistance low, the $I_2/C_2$ is set to preferably 1.2 or more, more preferably 1.4 or more. On the other hand, as the $I_2/C_2$ is increased, micropores in the catalyst layer decrease, and the gas diffusivity decreases. In view of suppressing the decrease of the gas diffusivity, the $I_2/C_2$ is preferably 2.5 or less.

In view of maintaining the proton transport resistance low in the anode catalyst layer, the $I_2/C_2$ in the anode catalyst layer may be set higher than the $I_1/C_1$ in the cathode catalyst layer. By setting like this, the diffusion of the water produced at the cathode toward the anode side can be facilitated, and the water retention in the anode catalyst layer can be improved, and thereby, the proton transport resistance can be maintained low.

With regard the blending ratio of the fibrous conductive member in the catalyst layer, both in the anode catalyst layer and the cathode catalyst layer, by including the fibrous conductive member in an amount of 30 parts or more by mass per 100 parts by mass of the particulate conductive member, the gas diffusivity can be enhanced. On the other hand, when the amount of the fibrous conductive member in the catalyst layer increases, the thickness of the catalyst layer increases, and the proton transport resistance tends to increase. Moreover, cracks tend to occur in the catalyst layer. In view of suppressing the increase in the proton transport resistance and the occurrence of cracks, in the cathode catalyst layer, the amount of the fibrous conductive member is 50 parts or less by mass per 100 parts by mass of the particulate conductive member, and in the anode catalyst layer, 60 parts or less by mass per 100 parts by mass of the particulate conductive member.

The catalyst layer is prepared, for example, as follows.

First, catalyst particles and a particulate conductive member are mixed in a dispersion medium (e.g., water, ethanol, propanol). Next, to the resultant dispersion under stirring, a proton conductive resin and a fibrous carbon material are added one after another, to obtain a catalyst dispersion. The proton conductive resin may be added dividedly in two or more times. In this case, in the second and subsequent addition, the proton conductive resin may be added together with the fibrous carbon material. Thereafter, the resultant catalyst dispersion is applied onto the surface of the electrolyte membrane or an appropriate transfer base sheet in a uniform thickness, followed by drying, to give a catalyst layer.

The application can be performed by a conventional application method, for example, spraying, screen printing, and coating using various coaters, such as a blade coater, a knife coater, and a gravure coater. The transfer base sheet is preferably a sheet with smooth surface, such as polyethylene terephthalate (PET) or polypropylene. When a transfer base sheet is used, the obtained catalyst layer is transferred onto an electrolyte film or a gas diffusion layer as described later.

The catalyst layer can be transferred onto the electrolyte membrane or the gas diffusion layer by allowing a surface of the catalyst layer, the surface having been faced the transfer base sheet, to be abutted against the electrolyte membrane or the gas diffusion layer. By abutting the smooth surface of the catalyst layer against the electrolyte membrane or the gas diffusion layer, the interface resistance with the catalyst layer is reduced, leading to improved performance of the fuel cell. The catalyst dispersion may be applied directly onto the electrolyte layer.

A description will be given below of an exemplary structure of a fuel cell according to the present embodiment, with reference to FIG. 1. FIG. 1 is a cross-sectional view schematically showing a structure of a unit cell included in a fuel cell according to an embodiment of the present disclosure. Typically, a plurality of unit cells are stacked and included as a cell stack in a fuel cell. In FIG. 1, one unit cell is shown for the sake of convenience. The fuel cell according to the present embodiment uses hydrogen ($H_2$) as a fuel.

A unit cell 200 includes a membrane electrode assembly 100 including: an electrolyte membrane 110; a first catalyst layer 120A and a second catalyst layer 120B disposed so as to sandwich the electrolyte membrane 110; and a first gas diffusion layer 130A and a second gas diffusion layer 130B disposed so as to sandwich the electrolyte membrane 110 via the first catalyst layer 120A and the second catalyst layer 120B, respectively. The unit cell 200 further includes a first separator 240A and a second separator 240B sandwiching the membrane electrode assembly 100. One of the first and second catalyst layers 120A and 120B functions as an anode, and the other functions as a cathode. The anode can be fed with a gas containing hydrogen ($H_2$) through a gas flow channel 260A or 260B. The electrolyte membrane 110 has a size slightly larger than the first catalyst layer 120A and the second catalyst layer 120B, a peripheral portion of the electrolyte membrane 110 protrudes from the first catalyst layer 120B and the second catalyst layer 120B. The peripheral portion of the electrolyte membrane 110 is held between a pair of seal members 250A and 250B.

One of the first and second catalyst layers 120A and 120B is an anode catalyst layer, and the other is a cathode catalyst layer. Here, the second catalyst layer 120B is taken as an anode catalyst layer. In this case, the first catalyst layer 120A is a cathode catalyst layer, and the first fibrous conductive member, the first particulate conductive member, and the first proton conductive resin are configured to satisfy the conditions (1) to (3) above. The second catalyst layer 120B is the anode catalyst layer, for which any known material and any known configuration used for the anode catalyst layer can be adopted. Also, the aforementioned configuration of the anode catalyst layer can be preferably adopted, in which the second fibrous conductive member, the second particulate conductive member, and the second proton conductive resin are blended so as to satisfy $I_2/C_2 > I_1/C_1$.

(Electrolyte Membrane)

The electrolyte membrane 110 is preferably a polymer electrolyte membrane. Examples of a material of the polymer electrolyte membrane include polymer electrolytes as exemplified for the proton conductive resin. The electrolyte membrane has a thickness of, for example, 5 to 30 µm.

(Gas Diffusion Layer)

The first gas diffusion layer 130A and the second gas diffusion layer 130B have a structure which may or may not include a substrate layer. The structure including a substrate layer includes, for example, in addition to the substrate layer, a microporous layer provided so as to face the catalyst layer. The substrate layer is, for example, an electrically conductive porous sheet, such as carbon cloth or carbon paper. The microporous layer is made of, for example, a mixture of a water repellent resin such as fluororesin, a conductive carbon material, and a proton conductive resin (polymer electrolyte).

(Separator)

The first separator 240A and the second separator 240B may be made of any material that have airtightness, electron conductivity and electrochemical stability. Preferable examples of such material include a carbon material and a metal material. The metal material may be coated with carbon. For example, the first separator 240A and the second separator 240B can be each obtained by cutting a metal sheet into a predetermined shape, and applying surface treatment thereto.

In the present embodiment, the first separator 240A is provided with the gas flow channel 260A on the side in contact with the first gas diffusion 130A. On the other hand, the second separator 240B is provided with the gas flow channel 260B on the side in contact with the second gas diffusion 130B. The gas flow channel may have any shape, and may be shaped into, for example, a straight channel or a serpentine channel.

(Sealing Member)

The seal members 250A and 250B are materials having elasticity, and serve to prevent leakage of the fuel and/or oxidant from the gas flow channels 260A and 260B. The sealing members 250A and 250B have, for example, a frame-like shape that annularly surrounds the periphery of the first catalyst layer 120A or the second catalyst layer 120B. For the seal members 250A and 250B, any known material and any known configuration can be adopted.

The present disclosure will be more specifically described below with reference to Examples. It is to be noted, however, that the present disclosure is not limited to the following Examples.

Example 1

<Preparation of Dispersion for Cathode Catalyst Layer>

A particulate electrically-conductive member (carbon black) supporting catalyst particles (Pt—Co alloy) was added to an appropriate amount of water, and stirred to be dispersed. To the resultant dispersion under stirring, an appropriate amount of ethanol was added. Then, per 100 parts by mass of the above particulate conductive member, 40 parts by mass of a fibrous electrically-conductive member (vapor-grown carbon fiber, average diameter: 150 nm, average fiber length: 10 µm) and 100 parts by mass of a proton conductive resin (perfluorocarbon sulfonic acid-based polymer, EW value: 700) were further added, and stirred together, to prepare a catalyst dispersion for cathode catalyst layer.

<Preparation of Dispersion for Anode Catalyst Layer>

A particulate electrically-conductive member (carbon black) supporting catalyst particles (Pt) was added to an appropriate amount of water, and stirred to be dispersed. To the resultant dispersion under stirring, an appropriate amount of ethanol was added. Then, per 100 parts by mass of the above particulate conductive member, 40 parts by mass of a fibrous electrically-conductive member (vapor-grown carbon fiber, average diameter: 150 nm, average fiber length: 10 µm) and 120 parts by mass of a proton conductive resin (perfluorocarbon sulfonic acid-based polymer, EW value: 900) were further added, and stirred together, to prepare a catalyst dispersion for anode catalyst layer.

In the cathode catalyst layer, $I_1/C_1=1.0$, and in the anode catalyst layer, $I_2/C_2=1.2$.

<Fabrication of Unit Cell>

Next, two PET sheets were prepared. Using screen printing method, the prepared catalyst dispersion for cathode catalyst layer was applied onto a smooth surface of one of the PET sheets in a uniform thickness, and the catalyst dispersion for anode catalyst layer was applied onto a smooth surface of the other PET sheet in a uniform thickness. This was followed by drying, to form two catalyst layers. The thickness of the cathode catalyst layer was 7 μm, and the thickness of the anode catalyst layer was 3 μm.

The obtained catalyst layers were respectively transferred onto both principal surfaces of an electrolyte membrane having a thickness of 15 μm, thereby to form a cathode on one of the surfaces of the electrolyte membrane and an anode on the other surface. Two porous electrically-conductive carbon sheets each serving as a gas diffusion layer were prepared, and one of them was brought into contact with the anode, and the other was brought into contact with the cathode.

Next, frame-like sealing members were respectively disposed so as to surround the anode and the cathode. The resultant whole was held between a pair of stainless-steel plates (separators) each having a gas flow channel in an area coming in contact with the gas diffusion layer, to complete a test unit cell A1.

<Evaluation>

The test unit cell A1 of Example 1 was evaluated for its power generation performance. Specifically, the unit cell A1 was heated to 80° C., and a fuel gas (H$_2$) having a relative humidity of 20 to 40% was fed to the anode, and an oxidant gas (air) having a relative humidity of 20 to 40% was fed to the cathode. The fuel gas and the oxidant gas were pressurized and fed such that the gas pressure at the cell inlet was 40 to 120 kPa. Then, with the current flow kept constant using a load controller, the current density per electrode area of the anode and the cathode was varied to measure a voltage (initial voltage) V, a resistance value R, and an output power density P of the unit cell A1.

Example 2

Per 100 parts by mass of the particulate conductive member 30 parts by mass of a fibrous electrically-conductive member (vapor-grown carbon fiber, average diameter: 150 nm, average fiber length: 10 μm) and 100 parts by mass of a proton conductive resin (perfluorocarbon sulfonic acid-based polymer, EW value: 700) were added, followed by stirring, to prepare a catalyst dispersion for cathode catalyst layer.

In a manner similar to in Example 1 except the above, a catalyst dispersion for anode catalyst layer was prepared, and a test unit cell A2 was completed.

In the unit cell A2, $I_1/C_1=1.0$ in the cathode catalyst layer.

Example 3

Per 100 parts by mass of the particulate conductive member, 40 parts by mass of a fibrous electrically-conductive member (vapor-grown carbon fiber, average diameter: 150 nm, average fiber length: 10 μm) and 100 parts by mass of a proton conductive resin (perfluorocarbon sulfonic acid-based polymer, EW value: 850) were added, followed by stirring, to prepare a catalyst dispersion for cathode catalyst layer.

In a manner similar to in Example 1 except the above, a catalyst dispersion for anode catalyst layer was prepared, and a test unit cell A3 was completed.

In the unit cell A3, $I_1/C_1=1.0$ in the cathode catalyst layer.

Comparative Example 1

In preparing a dispersion for cathode catalyst layer, a perfluorocarbon sulfonic acid-based polymer having an EW value of 900 was used as a proton conductive resin.

Per 100 parts by mass of the particulate conductive member, 20 parts by mass of a fibrous electrically-conductive member (vapor-grown carbon fiber, average diameter: 150 nm, average fiber length: 10 μm) and 120 parts by mass of a proton conductive resin (perfluorocarbon sulfonic acid-based polymer, EW value: 900) were added, followed by stirring, to prepare a catalyst dispersion for cathode catalyst layer.

In a manner similar to in Example 1 except the above, a catalyst dispersion for anode catalyst layer was prepared, and a test unit cell B1 was completed.

In the unit cell B1, $I_1/C_1=1.2$ in the cathode catalyst layer.

Comparative Example 2

In preparing a dispersion for cathode catalyst layer, no fibrous electrically-conductive member was added.

Per 100 parts by mass of the particulate conductive member, 120 parts by mass of a proton conductive resin (perfluorocarbon sulfonic acid-based polymer, EW value: 900) was added, followed by stirring, to prepare a catalyst dispersion for cathode catalyst layer.

In a manner similar to in Comparative Example 1 except the above, a catalyst dispersion for anode catalyst layer was prepared, and a test unit cell B2 was completed.

In the unit cell B2, $I_1/C_1=1.2$ in the cathode catalyst layer.

Comparative Example 3

Per 100 parts by mass of the particulate conductive member, 20 parts by mass of a fibrous electrically-conductive member (vapor-grown carbon fiber, average diameter: 150 nm, average fiber length: 10 μm) and 120 parts by mass of a proton conductive resin (perfluorocarbon sulfonic acid-based polymer, EW value: 700) were added, followed by stirring, to prepare a catalyst dispersion for cathode catalyst layer.

In a manner similar to in Example 1 except the above, a catalyst dispersion for anode catalyst layer was prepared, and a test unit cell B3 was completed.

In the unit cell B3, $I_1/C_1=1.2$ in the cathode catalyst layer.

Comparative Example 4

Per 100 parts by mass of the particulate conductive member, 20 parts by mass of a fibrous electrically-conductive member (vapor-grown carbon fiber, average diameter: 150 nm, average fiber length: 10 μm) and 100 parts by mass of a proton conductive resin(perfluorocarbon sulfonic acid-based polymer, EW value: 700) were added, followed by stirring, to prepare a catalyst dispersion for cathode catalyst layer.

In a manner similar to in Example 1 except the above, a catalyst dispersion for anode catalyst layer was prepared, and a test unit cell B4 was completed.

In the unit cell B4, $I_1/C_1=1.0$ in the cathode catalyst layer.

The results of measuring a maximum output power density of the cells A1 to A3, B1 and B4 are shown in Table 1. The maximum output power density is expressed as a relative value, with the maximum output power density of the cell B4 taken as 100.

In the cell B1, in which the EW value of the first proton conductive resin exceeded 850, and the blending ratio of the first fibrous conductive member to the first particulate conductive member is less than 30 mass %, the output power density was low. Moreover, in the cell B1, the output voltage dropped when the current density was increased to 1.4 A/cm² or higher, failing to generate power. In contrast, the cells A1 to A3 were able to continue to generate power until the current density was increased 2.6 A/cm². In the cells A1 to A3, the maximum output power density was more than twice as large as that of the cell B1.

The cells A1, A2 and B4 used the same first proton conductive resin and had the same but differed in the blending ratio of the first fibrous conductive member to the first particulate conductive member. Table 1 shows that in the cells A1 and A2 in which the blending ratio of the first fibrous conductive member to the first particulate conductive member was 30 mass % or more, the output power characteristics were remarkably improved as compared to the cell B4 in which the blending ratio of the first fibrous conductive member to the first particulate conductive member was 20 mass %.

| | Cathode catalyst layer | | | |
|---|---|---|---|---|
| Cell | EW value | $I_1/C_1$ | Fibrous conductive member (mass %) | Maximum output power density |
| A1 | 700 | 1.0 | 40 | 124 |
| A2 | 700 | 1.0 | 30 | 117 |
| A3 | 850 | 1.0 | 40 | 148 |
| B1 | 900 | 1.2 | 20 | 58 |
| B4 | 700 | 1.0 | 20 | 100 |

FIG. 2 shows the results of measuring a logarithmic differential pore volume dV/d (log D) distribution against the pore diameter D, with respect to the cathode catalyst layers used in the cell A1 of Example 1 and the cells B1 to B3 of Comparative Examples 1 to 3.

In the cells B1 and B2 of Comparative Examples 1 and 2, the log differential pore volume is somewhat present in the range of 0.006 μm to 0.015 μm. However, since the EW value of the first proton conductive resin exceeds 850, no clear peak appears within the above range. In the cell B3 of Comparative Example 3, the EW value of the first proton conductive resin is 850 or less, but since the blending ratio of the first fibrous conductive member to the first particulate conductive member is less than 30 mass %, no peak is observed in the range of 0.006 μm to 0,015 μm.

Examples 4 to 7

In preparing a dispersion for anode catalyst layer, the amount of the proton conductive resin added was changed from that in Example 1.

Per 100 parts by mass of the particulate conductive member, the proton conductive resin (perfluorocarbon sulfonic acid based polymer, EW value: 900) was added in an amount of 140 parts by mass, 160 parts by mass, 180 parts by mass, and 200 parts by mass, respectively, to prepare four catalyst dispersions for anode catalyst layer.

In a manner similar to in Example 1 except the above, test unit cells A4 to A7 were completed. A4 to A7 correspond to Examples 4 to 7, respectively. The cells A1 to A7 were evaluated similarly to in Example 1.

In the unit cells A4 to A7, $I_2/C_2=1.4$, 1.6, 1.8 and 2.0, respectively, in anode catalyst layer.

The results of measuring a maximum output power density of the cells A4 to A7 are shown in Table 2. The maximum output power density is expressed as a relative value, with the maximum output power density of the cell A1 taken as 100. The cells A1 and A4 to A7 all exhibited high output power under low-humidity operating conditions. In particular, the cells A4 to A7, in which the $I_2/C_2$ was 1.4 or more, showed remarkable improvement in the output power, as compared to the cell A1, in which the $I_2/C_2$ was 1.2.

TABLE 2

| | Anode catalyst layer | | | |
|---|---|---|---|---|
| Cell | EW value | $I_2/C_2$ | Fibrous conductive member (mass %) | Maximum output power density |
| A1 | 900 | 1.2 | 40 | 100 |
| A4 | 900 | 1.4 | 40 | 108 |
| A5 | 900 | 1.6 | 40 | 113 |
| A6 | 900 | 1.8 | 40 | 111 |
| A7 | 900 | 2.0 | 40 | 112 |

Examples 8 to 10

In preparing a dispersion for anode catalyst layer, the proton conductive resin and its amount added were changed from those in Example 1.

Per 100 parts by mass of the particulate conductive member, a proton conductive resin (perfluorocarbon sulfonic acid-based polymer. EW value: 780) was added in an amount of 120 parts by mass, 140 parts by mass, and 160 parts by mass, respectively, to prepare three catalyst dispersions for anode catalyst layer.

In a manner similar to in Example 1 except the above, test unit cells A8 to A10 were completed. A8 to A10 correspond to Examples 8 to 10, respectively. The cells A8 to A10 were evaluated similarly to in Example 1.

In the unit cells A8 to A10, $I_2/C_2=1.2$, 1.4 and 1.6, respectively in anode catalyst layer.

The results of measuring a maximum output power density of the cells A8 to A10 are shown in Table 3. The maximum output power density is expressed as a relative value, with the maximum output power density of the cell A1 taken as 100.

TABLE 3

| | Anode catalyst layer | | | |
|---|---|---|---|---|
| Cell | EW value | $I_2/C_2$ | Fibrous conductive member (mass %) | Maximum output power density |
| A8 | 780 | 1.2 | 40 | 122 |
| A9 | 780 | 1.4 | 40 | 119 |
| A10 | 780 | 1.6 | 40 | 120 |

INDUSTRIAL APPLICABILITY

The fuel cell according to the present disclosure can be suitably used as, for example, a power supply for stationary co-generation system for residential use, and a power supply for vehicles. The present disclosure can be suitably applied to a polymer electrolyte fuel cell, but is not limited thereto, and can be applied to fuel cells in general.

Although the present invention has been described in terms of the presently preferred embodiments, it is to be understood that such disclosure is not to be interpreted as limiting. Various alterations and modifications no doubt become apparent to those skilled in the art to which the present disclosure pertains, after having read the above disclosure. Accordingly, it is intended that the appended claims be interpreted as covering all alterations and modifications as fall thin the true spirit and scope of the invention.

REFERENCE SIGNS LIST

100: membrane electrode assembly 110: electrolyte membrane, 120: catalyst 120A: first catalyst layer, 120B: second catalyst layer, 130A: first gas diffusion layer, 130B: second gas diffusion layer, 200: fuel cell (unit cell), 240A: first separator, 240B: second separator, 250A, 250B: sealing member, 260A, 260B: gas flow channel

The invention claimed is:

1. A cathode catalyst layer of fuel cells, the cathode catalyst layer comprising:
a first fibrous electrically-conductive member, a first particulate electrically-conductive member, first catalyst particles, and a first proton conductive resin, wherein:
a ratio $I_1/C_1$ of a mass of the first proton conductive resin to a mass of the first particulate electrically-conductive member is in a range of 1.0 to 1.6,
a ratio of the first fibrous electrically-conductive member to 100 parts by mass of the first particulate electrically-conductive member is 30 to 50 parts by mass,
the first proton conductive resin has an EW value of 600 to 850,
the cathode catalyst has a porosity such that a logarithmic differential pore volume dV/d (log D) distribution as measured by a mercury intrusion porosimetry has a highest peak in a range of 0.006 μm to 0.015 μm in pore diameter D, and
in the logarithmic differential pore volume dV/d (log D) distribution, a total volume of pores inbetween pore diameter D of 0.006 μm to 0.015 μm is 20% or more of a total volume of pores inbetween pore diameter D of 0.006 μm to 0.2 μm.

2. A fuel cell, comprising:
a cathode having the cathode catalyst layer according to claim 1;
an anode; and
an electrolyte membrane interposed between the cathode and the anode.

3. The fuel cell according to claim 2, wherein:
the anode has an anode catalyst layer,
the anode catalyst layer includes a second fibrous electrically-conductive member, a second particulate electrically-conductive member, second catalyst particles, and a second proton conductive resin, and
a ratio $I_2/C_2$ of a mass of the second proton conductive resin to a mass of the second particulate electrically-conductive member is greater than the $I_1/C_1$.

4. The fuel cell according to claim 3, wherein in the anode catalyst layer,
a ratio of the second fibrous electrically-conductive member to 100 parts by mass of the second particulate electrically-conductive member is 30 to 60 parts by mass, and
the $I_2/C_2$ is 1.2 to 2.5.

5. The cathode catalyst layer according to claim 1, wherein
the total volume of pores having pore diameter D of 0.006 μm to 0.015 μm is obtained by integrating an area of the logarithmic differential pore volume dV/d (log D) distribution within the range of 0.006 μm to 0.015 μm, and
the total volume of pores having pore diameter D of 0.006 μm to 0.2 μm is obtained by integrating an area of the logarithmic differential pore volume dV/d (log D) distribution within the range of 0.006 μm to 0.2 μm.

* * * * *